United States Patent [19]

Weihrauch

[11] Patent Number: 4,637,660
[45] Date of Patent: Jan. 20, 1987

[54] METHOD FOR CONNECTING BRISTLES TO A BRISTLE CARRIER

[75] Inventor: Georg Weihrauch, Waldmichelbach, Fed. Rep. of Germany

[73] Assignee: Coronet-Werke Heinrich Schlerf GmbH, Waldmichelbach, Fed. Rep. of Germany

[21] Appl. No.: 696,639

[22] Filed: Jan. 30, 1985

[30] Foreign Application Priority Data

Feb. 1, 1984 [DE] Fed. Rep. of Germany ....... 3403341

[51] Int. Cl.$^4$ ............................................. A46D 3/04
[52] U.S. Cl. ........................................ 300/21; 264/243
[58] Field of Search ........................... 300/21; 264/243

[56] References Cited

U.S. PATENT DOCUMENTS 3,910,637 10/1975 Lewis, Jr. .................... 300/21 X
4,255,224 3/1981 Lorenz ......................... 300/21 X Primary Examiner—Mark Rosenbaum
Attorney, Agent, or Firm—McCormick, Paulding & Huber

[57] ABSTRACT

In a method for connecting bristles to a bristle carrier, each of which is made of thermoplastic material, at least the ends of the bristles are heated so that a reversal of the molecules from an oriented stretched form to a non-oriented balled form takes place and thereby forms a thickening on the bristle ends, upon which the bristles with their thickened ends are inserted into the melted bristle carrier until the melt of the carrier flows behind the thickened end whereby after hardening of the melt an interlocking shape connection is obtained between the bristles and the bristle carrier which joint may also include, in the case of corresponding work material pairs, a material bonding, the interlocking shape connection being independent of the type of materials used for the two parts.

7 Claims, 13 Drawing Figures

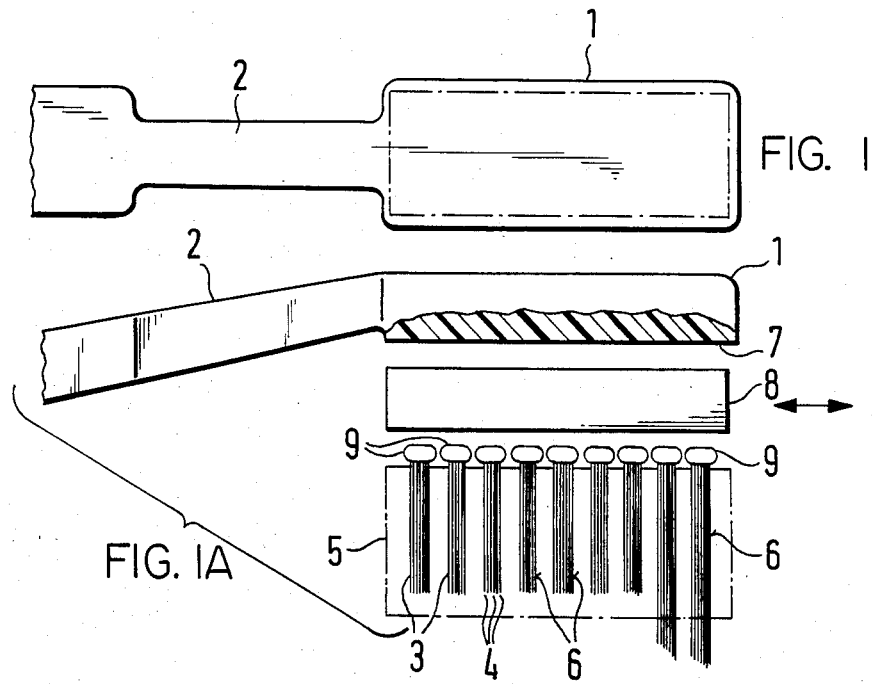
FIG. 1
FIG. 1A
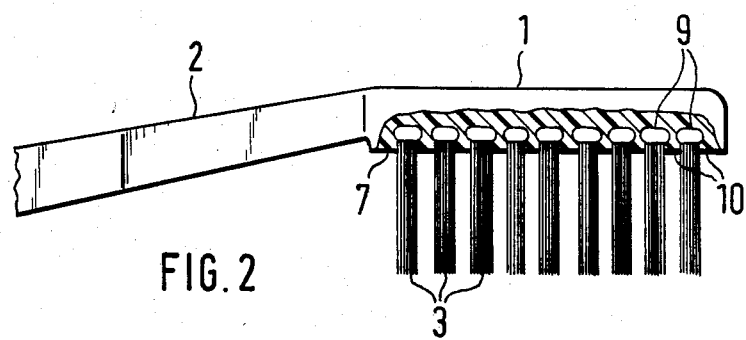
FIG. 2

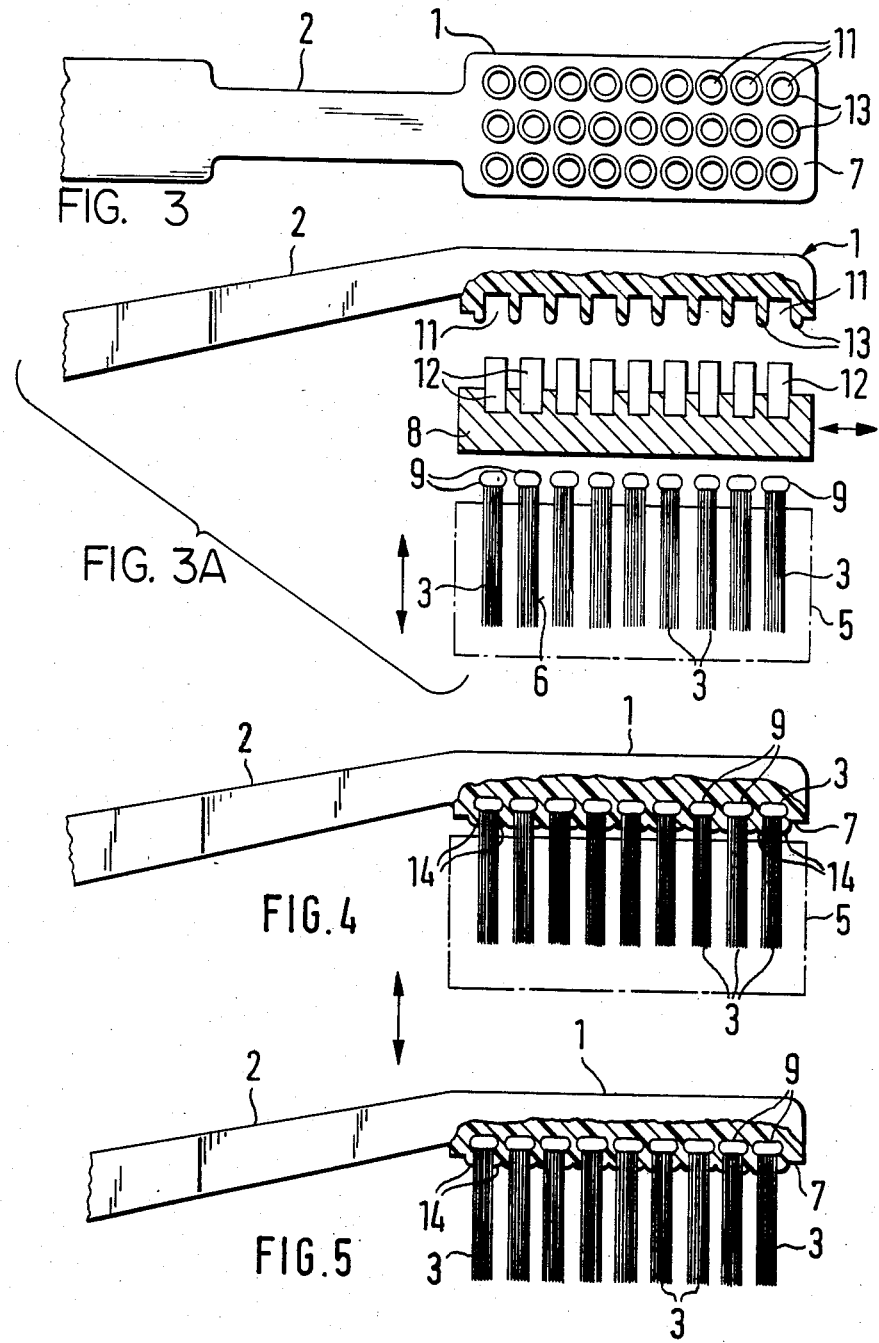

METHOD FOR CONNECTING BRISTLES TO A BRISTLE CARRIER

BACKGROUND OF THE INVENTION

The invention relates to a method for connecting bristles to a bristle carrier made of thermoplastic material in which method the bristles, at one of their ends, and the bristle carrier, at its bristle receiving area, are melted and subsequently are brought together and are held in this position, if necessary, until the melt rigidifies. Here the word bristle is to be understood to mean individual bristles and also arrangements each consisting of a plurality of bristles, as for example, bundles of bristles, bristle heads for paint brushes, bristle strips etc.

In the industry relating to paint brushes and other brushes, for more than ten years work has been performed on the problem of replacing by more economical methods the usual technique of connecting bristles to bristle carriers, in which the bristles are pulled into, glued into, stamped into or pressed into the carriers. In connection with this it is known (DE-PS Nos. 845,933, DE-AS 1,050,304) to melt one end of a bundle of bristles and to form it into a head or plate shaped enlargement, to insert the bundled bristles with the enlargement into a mold for the bristle carrier and subsequently to introduced melted plastic in liquid form into the mold so that after hardening of the plastic the individual bristle bundles are anchored in the bristle carrier. These techniques cannot be carried out in practice, however, because of finishing difficulties and also because of inadequate service characteristics of the finished product.

For this reason the investigations have not failed to try to connect bristles which consist of a thermoplastic material directly to the bristle carrier, which similarly is made of a thermoplastic material, by welding (DE-OS No. 2,335,468 corresponding to U.S. Pat. No. 3,471,200; DE-OS Nos. 2,849,510, and 2,937,241). In this case other known problems in plastic technique arise, so that a lasting weld connection with sufficient strength can only be achieved if both partners of the joint—bristles and bristle carrier—are made of the same material. The connection of dissimilar work materials, for example, of polyamid which is widely used for toothbrush bristles and polypropylene and polystyrol, has not succeeded satisfactorily in the past. The use of similar work materials on the other hand leads generally to an increase in the price of the produce since for the bristles a relatively high valued plastic has to be used because of the special requirements needed with respect to flexibility, restorability, resistance to wear, permanent elasticity, etc., and therefore for the bristle carrier a similar high valued plastic must be used, the bristle carrier in general having a substantially larger requirement as to quantity of plastic material.

So far as previously the welding of bristles and bristle carrier have been brought into consideration the bristle bundles have been melted at their ends and bluntly welded or fused to the bristle carrier made of the same thermoplastic material which, if necessary, may be partially melted. In this method the melted ends are engaged with the bristle carrier with a light pressure so that the melt at the receiving location of the bristle carrier is spread into a dish shape. It was also previously proposed to connect, dissimilar joint materials, namely polyurethane for the bristle carrier and polyamid for the bristles, to one another (DE-OS No. 2,937,241), with both joint materials being melted in the plane of the connection. Also of concern here is butt welding where extremely thin bristle carriers of about one millimeter are used which subsequently by warming may be formed into three dimensional shapes. It is further known to provide the bristle carrier beforehand with holes and to insert in these the melted ends of bristle bundles so that a butt welding takes place at the bottom of the holes (DE-OS No. 2,335,468) or so that the melted portion of the bristles substantially entirely fills the hole in the bristle carrier (DE-OS No. 2,937,241). In this case the retention of the bristle bundles may be improved if, for example, the holes are provided with undercuts and also presumably if the dish-shaped widening of the melt at the flat receiving side of the bristle carrier is avoided. These methods, which represent a type of filling of the holes, have not obtained practical significance.

For these reasons, therefore, in the practice of brush technology absolutely similar thermoplastic materials are required for the bristles and bristle carrier (Newspaper of the Brush and Paint Brush Industry, 1983, page 307). Also investigations in general plastic technology have shown (Prof. Dr. Ing. H. Potente "Joining of Different Plastomers" June 26, 1979 IKV-TH Aahen), that the majority of plastomers are not weldable or weldable with only imperfect results (abridgement) in "Plastic Worker" 1980 #4, pages 203–207).

The invention has as its object to depart from and change the aforedescribed methods and to improve on them so that for each desired pair of work materials, for bristle and bristle carrier, a faultless and lasting connection is obtained.

This object is solved in accordance with the invention in that the bristle ends are so heated that a reformation of the oriented stretched molecules into their non-oriented balled molecular form takes place and thereby forms a thickening at the bristle ends, and that the bristles with their thickened ends are pressed into the melted bristle carrier until the melt moves together behind the thickened ends.

The invention proceeds from the knowledge that, in the case of extruded bristles and above all in the case of additionally stretched bristles, because of the stretching processes the molecules are arranged in elongated chains and inside the bristles are arranged in the longitudinal direction of the bristles. Similar effects appear also with injection molded, extruded and the like bristle carriers, especially in the area of the upper surface, that is in the area near the die or other work tool. Here the effect is created principally by shear stresses in the boundary surface area. If the thermoplastic material is converted with this "frozen" orientation to the melted condition the molecules will again take on their stress-free balled form. With respect to the bristle ends this means that a ball is formed at the end of each individual bristle and inside a bristle bundle the individual balls flow together to a lens shaped head or widening under simultaneous shortening of the bristle length. In this condition the bristles are pressed into the melted receiving side of the bristle carrier until the thickened ends lie below the upper surface of the carrier. Thus the melt of the bristle carrier is so far displaced that a type of crater is formed which however after a short time flows together again so that the melt in the space behind the thickening of the bristle bundle flows inwardly to the circumference of the bristle bundle. This flowability of the melt rests in general on the recovery action of molecules in the area.

In the hardened condition a shape dependant connection involving interferring direct contact of the two joint materials is obtained since the bristle bundles inside the bristle carrier, because of the thickened or widened bristle ends, are anchored by plastic material which fills in behind those ends. In this way joints between dissimilar work materials may be rigidly and permanently connected with one another since the connection in this case is no longer arrived at merely through a welding or other similar bonding type connection. Also in the case of joint partners which are easily weldable so that a welded connection over the whole or a part of the inserted depth of the bristle bundle results this welded connection is improved by the considerably larger areas of the joint members in comparison to butt welding, and its is also improved by the supplemental shape connection made by the interferring shapes of the bristle bundles and bristle carrier. This is of especial improtance because the quality of such welded connections, which are made mostly by methods using heated elements in the case of many thermoplastic materials, for example polyamids used for the bristles, can be injured to the point of being unusable due to external influences during the welding process. Also, oxidation can easily take place on the melt surfaces making it impossible to effect the weld connection or making it possible only with great difficulty. This also is true in the case of dirt contamination or too high a humidity. The melting temperature must be fairly exactly controlled since the viscosity of the melt changes greatly with small temperature differences. The appearance of shrinking after cooling leads to stresses in the weld connection which influences its durability. Finally, the heating and cooling must take place slowly with the result that machine cycle times are relatively poor. With the methods according to the invention, and the additional making of the shape dependant connection, the negative effects of such influences may be eliminated. Practical investigations have shown that now only bristles and bristle carriers of desired work material pairs can be joined together without problem but also work materials of different structures (cast, injected, foamed, etc.). It has further been shown that in comparison to state-of-the-art brushes the retention strength of bristles anchored in accordance with the invention is increased many times. Also eliminated are outwardly open holes aften found in customary brushes and which often, for example, in the case of toothbrushes, represent a hygienic problem. In comparison to customary drilled bristle carriers, which necessarily are weakened by such drilling, the methods of the present invention produce a higher strength for the bristle carrier so that the wall thickness of the bristle carrier can be reduced to a minimum which is only slightly larger than the insertion depth of the bristle bundles. This is important in the case of certain applications, for example in the case of toothbrushes, since only the bristle length needed to achieve the properties required for the use in important and not the wall thickness of the bristle carrier. Toothbrushes can therefore be made shallow with similar bristle lengths or instead can be provided with longer bristles to give them a corresponding overall height. In the case of need, for example in the case of belts, bands, or the like, the flexability of the bristle carrier can be increased by reducing the wall thickness without impairing the hold of the bristles in the carrier.

According to one embodiment of the invention the thickened end of the bristle is cooled to partial or complete hardness and subsequently is pressed into the melted receiving side of the bristle carrier. This method is particularly well suited to the case where the material of the bristle carrier, or the bristle carrier because of its construction, is subjected to only a relatively slight warming so that the melt on the receiving side is very viscous.

In the case of all the work material pairs, however, the thickened end of the bristle while still in a weak condition can be pressed into the melted receiving side of the bristle carrier, without thereby the thickened end becoming unfavorably deformed to the point that a reverse flow of the melt of the bristle carrier over the thickened end of the bristle is not longer possible.

It can be provided in further modifications that the bristles are formed at their thickened ends during or directly after the warming. This is recommened mainly in the case of large bristle bundles and bristle packets or the like, if the restoring effect from stretched molecules to balled molecules is slightly pronounced or if the bristle ends are warmed to only a slight degree.

The connection made in accordance with the invention has in comparison to butt welded connections, a further distinguishing advantage:

The transition zone between the linear area of the bristle and the dish-shaped enlargement where welding occurs is the weakest area of the bristle, the bristle being subject to being especially easily bent or snapped off at this zone. Also the fatigue strength is reduced at this zone. In the case of the method of the invention this zone of weakening of the bristle is anchored in the bristle carrier, and above all the outer bristles of a bundle above this zone of weakening are regularly clamped together by the material of the bristle carrier so that the point of weakening itself is in general not subjected to any loads.

According to a further embodiment of the method of the invention recesses are formed in the bristle carrier before or during the warming of the receiving side for receiving the bundled bristles. The depth of these recesses can correspond to the required insertion depth of bristle bundles so that by means of the melting process only the plasticizing of the recesses and the flow of material behind the thickened ends of the bristle bundles takes place. It is however also possible to form the recesses with shallower depths and to press in the bristle bundles to their final depths.

Preferably these embodiments are so carried out that during the forming of the recesses beads are formed which extend outwardly from the receiving side. In this way a bead or stud is formed around each recess which extends outwardly from the receiving side of the bristle carrier. Then either the bristle bundle is inserted directly after this melting process or the bristle carrier made in this way and after hardening is warmed before the insertion of the bristle bundles so that the material of the bead or stud again moves into the space behind the thickened bristle ends. Here again the described reorganization in the molecular region comes into play and takes an essential role.

In cases in which the forementioned effect does not automatically occur in sufficient measure, for example, in the case of thick bristle bundles or bristle packets it can also be provided that the bristle carrier on its receiving surface and directly surrounding the inset bristles is subsequently formed to displace the melt into the space behind the thickened ends. This subsequent forming if necessary can be such that on the receiving side of the bristle carrier a parti-spherical elevation is created around each bristle bundle so that the supported length of the bristles in the bristle carrier is increased. The subsequent forming can however also be carried out so as to produce only a flush or smooth surface on the receiving side.

Finally, it can be provided that during the formation of the recesses their bottoms are curved and that the ends of the bundled bristles correspond to this curvature. In this case the formation of the recesses is also preferably so carried out that a bead is created in the area surrounding each recess. The correspondingly formed bundle end with its thickening is pressed into the melted recess so that the material from the bead flows behind the thickening.

According to a further feature of the invention the bristle carrier on its rear side, located opposite from the receiving side, is melted in the same way as the receiving side. With this procedure a further effect which may appear in carrying out the method of the invention can be dealt with. Because of the reverse formation of the stretched molecules into their balled shape they can in individual cases curve or warp the bristle carrier. This warping is compensated for by the heating of the rear side.

With the melting or heating of the rear side further aims can be achieved if the occasion arises; for example bristles can likewise be inserted into this rear side to, for example, make a double sided brush with, if need be, different types of bristles in different arrangements (handbrushes). Instead of this a stamp, for example, in the form of a decoration can also be applied.

The melting of the bristle ends and/or of the bristle carrier can be carried out by contact warming, for example, in a heating element method or a heat reflecting method, or can be carried out by contactless warming, for example, by heat radiation, air, or the like. Even in the case of contactless warming the lens-shaped heads or thickenings are formed.

In the following the invention is described in connection with several embodiments illustrated by the drawings.

The drawings are:

FIG. 1 is a partial plan view of a bristle carrier used in carrying out one embodiment of the invention.

FIG. 1(a) is a schematic view of an apparatus, including the bristle carrier of FIG. 1, for carrying out one embodiment of the invention.

FIG. 2 is a partially cut away side view of a brush, after the joining process, made with the apparatus of FIG. 1(a).

FIG. 3 is a plan view of a bristle carrier used in carrying out another embodiment of the invention.

FIG. 3(a) is a schematic view of an apparatus, including the bristle carrier of FIG. 3, for carrying out another embodiment of the invention, this view showing the apparatus in a work stage corresponding to that of FIG. 1(a).

FIG. 4 is a view showing the apparatus of FIG. 3 in the joining stage.

FIG. 5 is a partially cut away side view of a brush manufactured from the apparatus of FIG. 3.

DETAILED DESCRIPTION OF THE PREFERRED EMBODIMENTS

Figure 6:
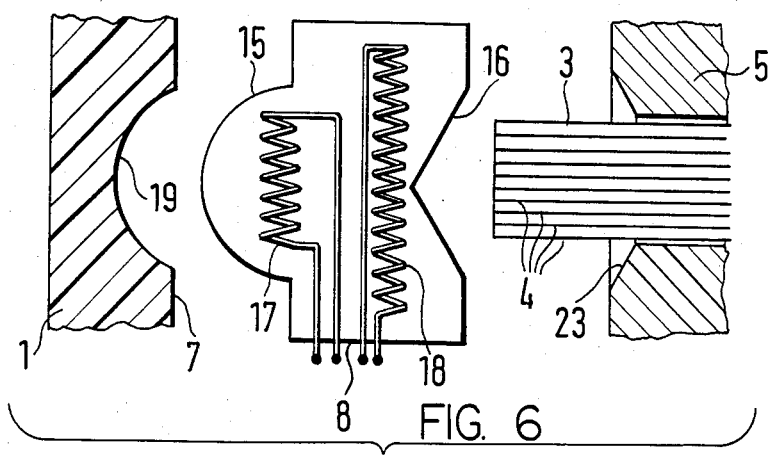
FIG. 6 shows a variation of the apparatus of FIG. 3 in the starting stage.

FIG. 1 schematically shows an apparatus for manufacturing a toothbrush. In FIG. 1 the handle 2 and the generally rectangular brush carrier 1 connected to it are shown in plan view and in FIG. 1(a) they are shown in side view. The bristle carrier 1 and/or the handle 2 are held in a non-illustrated holding fixture. Spaced therefrom is a support 6 having a number of receivers 6 in each of which is arranged a bundle 3 consisting of a plurality of bristles 4. According to desire, the bristle bundles 3 can be inserted into the carrier 5 already cut to a given length or can be inserted in endless uncut form as shown at the right in FIG. 1(a). In the illustrated example the warming of the receiving side 7 of the bristle carrier 1 as well as of the ends of the bristle bundles 3 is effected by means of a plate-shaped heating element 8 arranged between the bristle carrier 1 and the free ends of the bristle bundles 3. The heating element 8 is movable in the direction of the double arrow shown at the right in FIG. 1(a) and can therefore be moved into the space between the bristle carrier and the bristles and, after the melting of the ends of the bristle bundles 3 and the receiving side 7 of the bristle carrier 1, can be withdrawn so that the bristle carrier and bristle ends can be moved into engagement with one another. In FIG. 1 the melt zone of the bristle receiving side 7 is illustrated by the dashed lines.

In the warming of the bristles by moving the support to the heating element 8, or the reverse, or by a non-illustrated contactless heating, solely the free ends of the bristles are melted, as a result of which they fuse together and form on each bundle a rounded, lens-shaped head 9. With the bristle bundles in this form they and the bristle carrier 1 are brought together and the thickened ends 9 are pressed under pressure into the melted receiving side 7 of the bristle carrier until they reach the position shown in FIG. 2. The melted material of the bristle carrier 1 on the receiving side flows behind the thickened ends 9 so that the craters formed by the insertion of the bristle bundles are then closed, as indicated at 10, by the intrusion of the melted material. In cases where the bristle bundles are substantially endless ones they are cut to length after this joining process.

In a modified embodiment of the invention according to FIG. 3, the bristle carrier 1 is provided with receiving recesses 11 on its receiving side 7, the geometry and arrangement of the recesses corresponding to that of the bristle bundle set. The recesses 11 can be preformed or also, as shown in FIG. 3, can be formed by means of a corresponding heating element 8 having individual heating pins 12.

Upon melting of the receiving side of the bristle carrier 1 the molten material flows outwardly into annular collars 13 extending from the receiving surface of the bristle carrier. At the same time, as already shown with reference to FIGS. 1 and 2, the free ends of the bristle bundles 3 are melted so that they again, as in FIG. 1(a), form thickenings 9. After the heating element is moved away the bristle carrier 1 and the bristle bundles 3 are moved together (FIG. 4) whereupon the thickenings 9 intrude into the recesses 11 and the molten material of the annular collars again flows behind the thickenings 9. In this case the receiving side 7 of the bristle carrier 1 is no longer even or flat, but in the area of each bristle bundle forms a protrusion 14 (FIG. 4, 5).

In FIGS. 6 through 9 a method similar to that of FIGS. 3 through 5 is shown in connection with a single individual bristle bundle. Again shown are the bristle carrier 1, and a support 5 for receiving the bristle bundle 3 which may either be cut or part of an endless strand, with a heating element 8 being arranged between the bristle carrier 1 and the support 5. The heating element 8 has on one of its sides a forming surface 15 in the form of a partial sphere and on its other side a forming surface 16 in the form of a flat cone. The heating element 8 further is equipped with two separate heating elements, that is an element 17 for one side and an element 18 for the other side, which maintain different temperatures in the area of the partially spherical forming surface 15 and the conical forming surface 17 suitable to the melting point of the associated work materials forming pair to be joined. Such a temperature separation in the heating element can obviously also be provided in the case of the embodiments according to FIGS. 1 through 6. In this embodiment the support 5 is also made as a forming tool. Namely it has a flat conical countersink 23 in the area at which the bristles leave the support.

Figure 7:
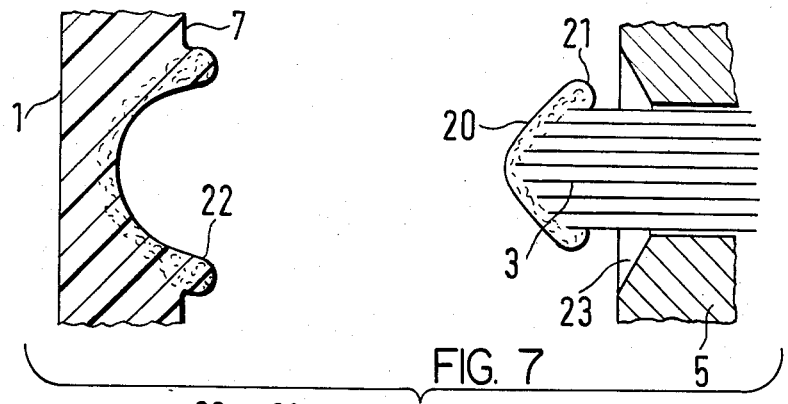
FIG. 7 and FIG. 8 are views showing the apparatus of FIG. 6 in two intermediate stages.
Figure 8:
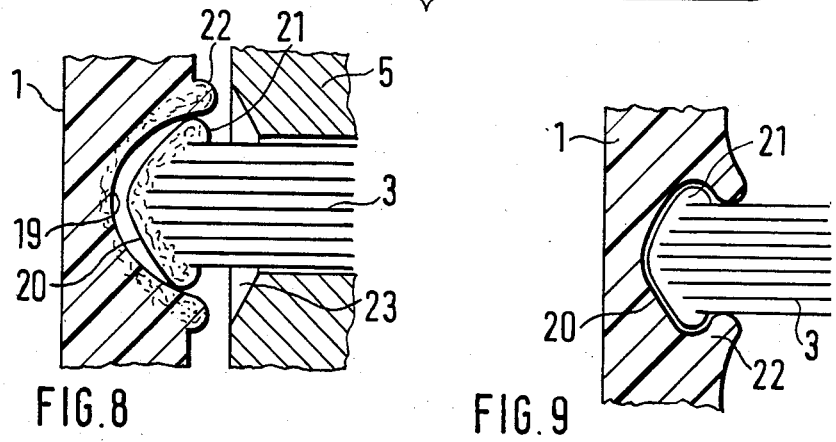

By means of the spherical forming surface 15 a corresponding cup-shaped recess 19 is created in the bristle carrier 1, while by moving together the heating element 8 and the support 5 the end of the bristle bundle 3 will be brought to the form shown in FIG. 7 having a conical shaped thickening 20 with a peripheral bead 21.

The recess in the bristle carrier 1 can, as previously explained, be made during the melting process or also can be made previously during the manufacture of the bristle carrier. In any event during the melting process the material of the recess 19 is displaced into a bead-shaped ring 22 which projects from the receiving side 7 of the bristle carrier 1 (FIG. 7).

Figure 9:
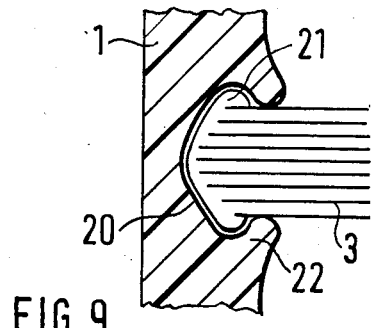
FIG. 9 is a detailed view of the finished connection between a bristle bundle and the bristle carrier in enlarged view.

After the removal of the heating element 8, the support 5 with the bristle bundle 3 is moved to the bristle carrier 1 so that the conical thickening 20 is inserted into the recess 19 until the bead 22 of the bristle carrier 1 is located behind the bead 21 on the bristle bundle 3. Then a interlocking shape connection is formed between the bristle carrier 1 and the bristle bundle 3, as generally shown in FIG. 9, which provides a rigid connection even in the case of unweldable work material pairs which do not form a connection arising from the bonding or cohesion of the materials to one another. If needed the connection can be improved by compressing the bead 22 by means of the forming surface 23 on the support 5.

Figure 10:
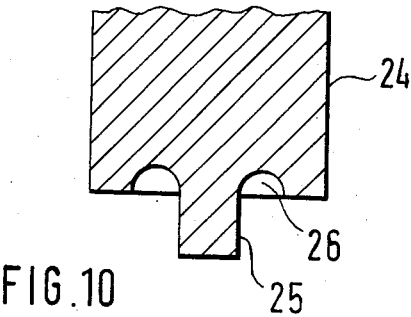
FIG. 10 is a sectional view of a forming tool for making recesses in the bristle carrier.
Figure 11:
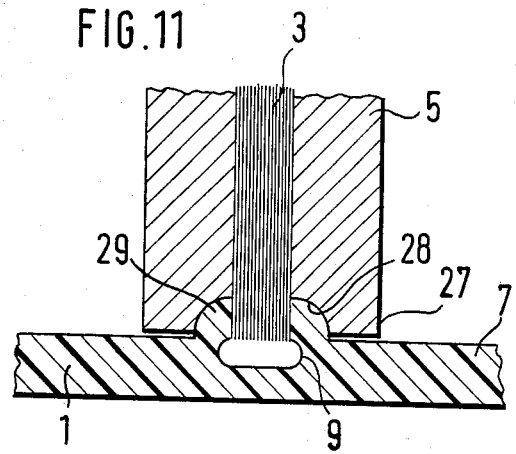
FIG. 11 is a sectional view of a joint forming tool shown in its working position.

FIG. 10 shows a forming tool 24 for making recesses in the bristle carrier. This forming tool has a central pin 25 for forming the recess as well as a groove 26 surrounding the base of the pin. During the formation of a recess the groove 26 serves to form the displaced material into an annular bead. In the insertion of a bristle bundle 3 with a melted end having a thickening 9 into the melted receiving side 7 of a bristle carrier a portion of the bristle support 5 can for example be shaped as a forming tool 27 having an annular recess 28 in the area at which the bristle bundle leaves the support. The support 5 is moved with the bristle bundle 3 towards the bristle carrier 1 so that the bristle bundle 3 is inserted into the melted recess formed by the pin 25 of the forming tool 24 (FIG. 10). With further movement together of these parts the annular bead formed by the groove 26 of the forming tool 24 (FIG. 10) is formed into an annular bead 29 of definite form while still molten. Therefore, a contour is formed on the receiving side of the bristle carrier, similar to that described in connection with FIGS. 4 and 5. Above all in this way the supported length of the bristles inside the bristle carrier 1 can be optimizied in the case of bristle carriers of minimal wall thickness. Additionally, the surface of the receiving side is given a smooth finish.

I claim:

1. A method for connecting bristles to a bristle carrier both of which are made of thermoplastic material, said method comprising the steps of:

melting a bundle of such bristles at one end to such an extent that a reversal of their oriented, stretched molecular form takes place converting the molecules to a non-oriented balled form and thereby thickening the bristle ends to form a thickening on said one end of said bundle, melting said bristle carrier at a bristle receiving surface, forming a recess in the melted material of said bristle carrier for receiving said bristle bundle, during the forming of said recess displacing the material of said bristle carrier to form a bead surrounding said recess and extending outwardly from said bristle receiving surface of said bristle carrier, and inserting said thickening of said bristle bundle into the melted bristle carrier until the melt of the bristle carrier flows around and thereby encloses said thickening of said bundle.

2. A method according to claim 1 further characterized by said step of melting a bundle of bristles being carried out by so melting a plurality of bundles of bristles simultaneously, said step of forming a recess in said bristle carrier being carried out by forming a plurality of such recesses simultaneously, said step of forming a bead being carried out by forming a plurality of such beads, one for each of said recesses, simultaneously, and said step of inserting said thickening of said bundle into the melted bristle carrier being carried out by simultaneously inserting the thickenings of said plurality of bundles into said plurality of recesses.

3. A method according to claim 1 further characterized by reverse forming said bead after the insertion of said thickening of said bundle into said recess to smooth the outer surface of said bead.

4. A method according to claim 1 further characterized by said step of melting a bundle of bristles being carried out by melting at least two bundles of bristles to form a thickening on one end of each of said two bundles, said step of melting said bristle carrier at its bristle receiving surface being carried out by also at the same time melting said bristle carrier at a second bristle receiving surface located on an opposite side of said bristle carrier from said first bristle receiving surface, said step of forming a recess in the melted material of said bristle carrier being carried out by forming two recesses, one in each of said two bristle receiving surfaces, said step of forming a bead being carried out by forming a bead for each of said two recesses, and said step of inserting said thickening of said bundle into the melted bristle carrier being carried out by simultaneously inserting said two bundles into each of said two recesses located respectively in different ones of said two bristle receiving surfaces.

5. A method according to claim 1 further characterized by during said step of melting said bristle carrier at a bristle receiving surface stamping an impression into said bristle carrier on a side opposite from said bristle receiving surface.

6. A method according to claim 1 further characterized in that the melting of both said bundle of bristles and said melting of said bristle carrier is accomplished by contactless heating.

7. A method according to claim 1 further characterized in that the melting of both said bundles of bristles and said melting of said bristle carrier is accomplished by contact heating.

* * * * *